US009502189B2

(12) United States Patent
Maruyama et al.

(10) Patent No.: US 9,502,189 B2
(45) Date of Patent: Nov. 22, 2016

(54) EXCITATION INRUSH-CURRENT SUPPRESSION SYSTEM

(71) Applicant: KABUSHIKI KAISHA TOSHIBA, Minato-ku (JP)

(72) Inventors: Shiro Maruyama, Yokohama (JP); Minoru Saito, Kamakura (JP); Tadashi Koshizuka, Saitama (JP); Tomohiko Mitani, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 426 days.

(21) Appl. No.: 14/105,846

(22) Filed: Dec. 13, 2013

(65) Prior Publication Data

US 2014/0168846 A1   Jun. 19, 2014

(30) Foreign Application Priority Data

Dec. 14, 2012   (JP) ................. 2012-273555

(51) Int. Cl.
*H01H 9/56* (2006.01)
*H02H 9/00* (2006.01)

(52) U.S. Cl.
CPC ............ *H01H 9/563* (2013.01); *H02H 9/002* (2013.01)

(58) Field of Classification Search
CPC ........ H02H 9/046; H02H 9/042; H02H 3/00; H02H 7/045; H02H 3/28; H02H 7/0455; H02H 3/44; H02H 9/025; H02H 3/087; H02H 9/002; H02H 11/00; H02H 7/04; H02H 7/042; H02H 9/001; H01L 27/0248; H01L 27/0266; H01L 27/0251; H01T 1/14; H01T 1/15; H01H 85/44; H01H 9/106; H01H 9/563; H01H 9/56; H01C 7/126; H02K 3/28; H02K 19/34; H02K 19/38; H02J 7/1423; H02J 7/1484; H02J 7/1438; H02J 9/005; H02J 9/06; H02J 9/061; H02J 7/22; H02P 9/305; H02P 9/102; H02P 9/32; H02P 9/38; H02P 2009/005; H02P 9/30; H01F 27/34; H01F 27/402; H03K 17/0822; G01R 19/16542; H05B 39/08; F02N 11/04; G05F 1/573; H02M 1/32; H02M 1/36; H02M 3/33507; H02M 7/517; H02M 2001/0006; Y02B 70/126
USPC ........... 307/130, 125; 361/35, 111, 93.9, 36; 322/25, 59, 90; 323/908; 363/49
See application file for complete search history.

(56) References Cited

U.S. PATENT DOCUMENTS

2004/0124814 A1* 7/2004 Tsutada ................. G05F 1/12
                                                                            323/247
2009/0097173 A1   4/2009 Kinoshita et al.

(Continued)

FOREIGN PATENT DOCUMENTS

CN    101414528 A    4/2009
CN    101609983 A    12/2009

(Continued)

OTHER PUBLICATIONS

John H. Brunke, et al., "Elimination of Transformer Inrush Currents by Controlled Switching—Part I: Theoretical Considerations", IEEE Transactions on Power Delivery, vol. 16, No. 2, Apr. 2001, 5 pages.

(Continued)

*Primary Examiner* — Thienvu Tran
*Assistant Examiner* — Brian K Baxter
(74) *Attorney, Agent, or Firm* — Oblon, McClelland, Maier & Neustadt, L.L.P

(57) ABSTRACT

According to an embodiment, when a transformer that is connected to a first power supply through a first breaker as well as to a second power supply through a second breaker is detected to be disconnected from the power supplies, a specific phase of the three phases of the first breaker is closed to suppress an excitation inrush current, based on calculated residual magnetic fluxes and a voltage of the first power supply, and thereafter, the remaining two phases are closed. Based on the calculated residual magnetic fluxes and a voltage of the second power supply, a specific phase of the three phases of the second breaker is closed to suppress an excitation inrush current, and thereafter, the remaining two phases are closed.

8 Claims, 4 Drawing Sheets

(56) References Cited

U.S. PATENT DOCUMENTS

| | | | |
|---|---|---|---|
| 2009/0134862 A1 | 5/2009 | Kinoshita et al. | |
| 2010/0039737 A1 | 2/2010 | Koshizuka et al. | |
| 2012/0293896 A1* | 11/2012 | Mori | H02H 9/002 361/35 |
| 2013/0175879 A1* | 7/2013 | Taylor | H02H 9/002 307/125 |
| 2013/0208386 A1* | 8/2013 | Kai | H02H 7/04 361/115 |

FOREIGN PATENT DOCUMENTS

| | | |
|---|---|---|
| JP | 2004-208394 | 7/2004 |
| JP | 2007-259681 | 10/2007 |
| JP | 2009-99347 | 5/2009 |
| JP | 2009-131106 A | 6/2009 |
| JP | 2010-4686 | 1/2010 |
| JP | 4835870 B2 | 12/2011 |
| JP | 2013-257993 A | 12/2013 |
| JP | 2014-143049 | 8/2014 |
| WO | WO 2008/136071 A1 | 11/2008 |

OTHER PUBLICATIONS

Combined Office Action and Search Report issued Dec. 31, 2015 in Chinese Patent Application No. 201310685282.9 (with English translation and English translation of category of cited documents).
Japanese Office Action issued Aug. 2, 2016 in Japanese Application No. 2012-273555 (with English translation), 7 pages.

* cited by examiner

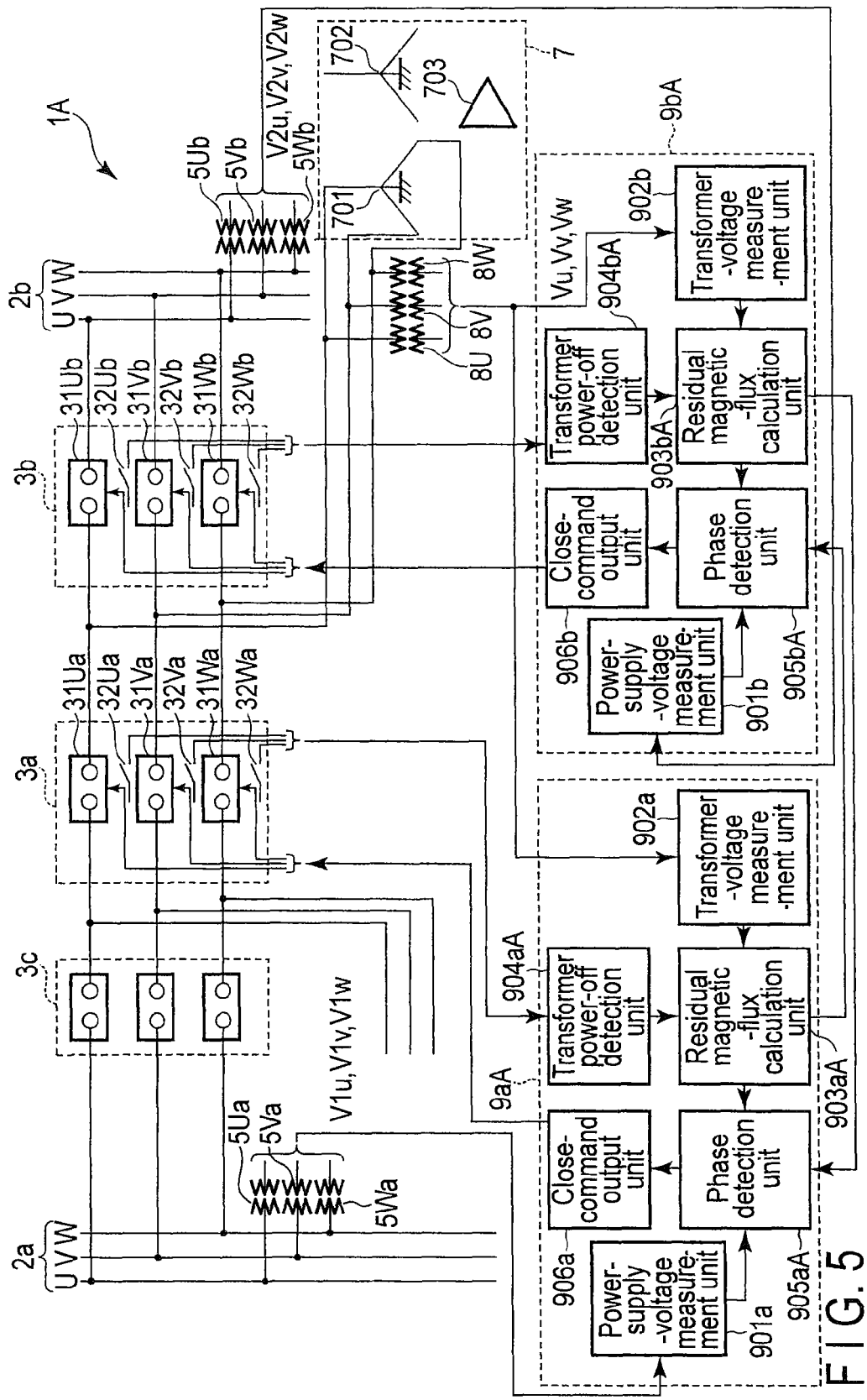
F I G. 5

EXCITATION INRUSH-CURRENT SUPPRESSION SYSTEM

CROSS-REFERENCE TO RELATED APPLICATIONS

This application is based upon and claims the benefit of priority from prior Japanese Patent Applications No. 2012-273555, filed Dec. 14, 2012, the entire contents of which are incorporated herein by reference.

FIELD

Embodiments described herein relate generally to a magnetization inrush-current suppression system for suppressing a magnetization inrush current which is generated when a transformer is powered on.

BACKGROUND

As is commonly known, a large excitation inrush current flows when excitation is performed by supplying power under no load in the state where a magnetic flux remains about an iron core of a transformer. The excitation inrush current is several times greater than the rated load current of the transformer. When such a large excitation inrush current flows, a system voltage fluctuates. If the voltage fluctuation is great, the change influences consumers.

According to a known method for suppressing an excitation inrush current, when a transformer is disconnected from the power supplies, a residual magnetic flux is calculated from a voltage signal on the primary side of a transformer, and a breaker of a reference phase is closed at the timing when a prospective magnetic flux of the reference phase and the residual magnetic flux correspond to each other. Thereafter, the remaining two breakers are closed by causing a delay to minimize a difference between a prospective magnetic flux of another phase and the residual magnetic flux.

However, in a system configuration such as 1½ (one and half) bus configuration which enables a transformer to connect to power supplies by two breakers, which of the two breakers disconnects the transformer from the power supply or connects the transformer to the power supply cannot be known beforehand. Therefore, there is a difficulty in closing the two breakers in phases which suppress an excitation inrush current.

There are relevant prior-art literatures as follows.
Patent Document 1: Jpn. Pat. Appln. KOKAI Publication No. 2009-99347
Patent Document 2: Jpn. Pat. Appln. KOKAI Publication No. 2010-4686
Non-Patent Document 1: John H. Brunke et al., "Elimination of Transformer Inrush Currents by Controlled Switching—Part I: Theoretical Considerations", IEEE Transactions on Power Delivery, IEEE, April 2001, Vol. 16, No. 2, pp. 276 to 280

Under the circumstances as described above, there is a demand for providing an excitation inrush-current suppression system capable of suppressing an excitation inrush current to be generated when a transformer is connected to power supplies in a system configuration which enables the transformer to connect to the power supplies through two breakers.

BRIEF DESCRIPTION OF THE DRAWINGS

FIG. 5 shows a configuration of an excitation inrush-current suppression system according to a second embodiment of the invention.

DETAILED DESCRIPTION

Figure 1:
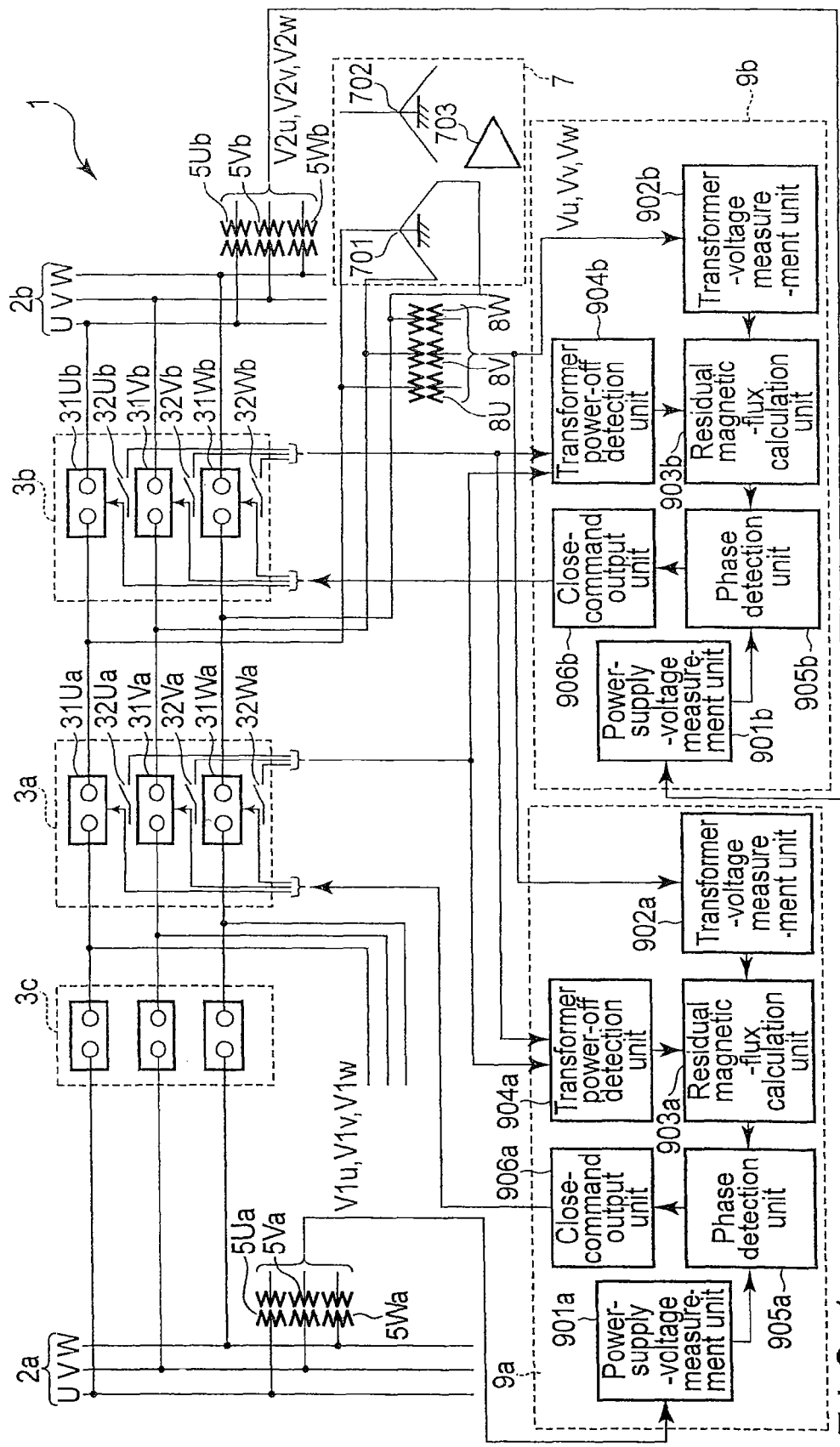
FIG. 1 shows a configuration of an excitation inrush-current suppression system according to a first embodiment of the invention.

Embodiments will be described below with reference to the drawings.

In general, according to one embodiment, there is provided an excitation-inrush-current suppression system which suppresses an excitation inrush current of a transformer connected through a first breaker to a first power supply and connected through a second breaker to a second power supply.

The excitation-inrush-current suppression system comprises:

a transformer-voltage measurement unit configured to measure three-phase alternating-current voltages of the transformer;

a transformer power-off detection unit configured to detect that the transformer is disconnected from the power supplies;

a residual magnetic flux calculation unit configured to calculate residual magnetic fluxes of three phases of the transformer, based on the three-phase alternating-current voltages measured by the transformer-voltage measurement unit, when the transformer is detected to be disconnected from the power supplies by the transformer power-off detection unit;

a first power-supply-voltage measurement unit configured to measure three-phase alternating-current voltages of the first power supply;

a first closing unit configured to close a specific phase of the three phases of the first breaker at a first closing phase for suppressing an excitation inrush current, the specific phase being either a phase having a maximum absolute value or a minimum absolute value among the residual magnetic fluxes of the three phases, based on the residual magnetic fluxes of the three phases of the transformer calculated by the residual magnetic flux calculation unit and the three-phase alternating-current voltages of the first power supply measured by the first power-supply-voltage measurement unit;

a second closing unit configured to close two phases other than the specific phase of the first breaker, at a second closing phase for suppressing an excitation inrush current, after closing the specific phase of the first breaker by the first closing unit;

a second power-supply-voltage measurement unit configured to measure three-phase alternating-current voltages of the second power supply;

a third closing unit configured to close a specific phase of the three phases of the second breaker at a third closing phase for suppressing an excitation inrush current, the specific phase being either a phase having a maximum absolute value or a minimum absolute value among the residual magnetic fluxes of the three phases, based on the residual magnetic fluxes of the three phases of the transformer calculated by the residual magnetic flux calculation unit and the three-phase alternating-current voltages of the second power supply measured by the second power-supply-voltage measurement unit; and a fourth closing unit configured to close two phases other than the specific phase of the second breaker, at a fourth closing phase for suppressing an excitation inrush current, after closing the specific phase of the second breaker by the third closing unit.

First Embodiment

FIG. 1 shows a configuration of an excitation inrush-current suppression system 1 according to the first embodiment of the invention. Components which are common to the following figures will be denoted by common reference signs, respectively. Detailed descriptions of those components will be omitted and only components which differ among the figures will be described below.

An excitation inrush-current suppression system 1 is applied to a power system having a 1½ (one and half) bus configuration.

The excitation inrush-current suppression system 1 comprises two power supply buses 2a and 2b, three breakers 3a, 3b, and 3c, two sets of power-supply-voltage detectors 5Ua, 5Va, and 5Wa, and 5Ub, 5Vb, and 5Wb for three phases, a transformer 7, transformer terminal-voltage detectors 8U, 8V, and 8W for three phases, and two excitation inrush-current suppression apparatuses 9a and 9b.

The first power supply bus 2a and the second power supply bus 2b are buses of a power system comprising a power supply of a three-phase alternating current having a U phase, a V phase, and a W phase.

A primary side of the transformer 7 is connected to the first power supply bus 2a through the first breaker 3a and the third breaker 3c and also connected to the second power supply bus 2b through the second breaker 3b. Loads are connected between the first breaker 3a and the third breaker 3c. The transformer 7 is applied with no load when powered on. Hereinafter, the third breaker 3c is assumed to be constantly closed unless otherwise mentioned.

The transformer 7 is a three-phase transformer comprising three coils, which transforms three-phase alternating-current voltages. The transformer 7 comprises a primary coil 701, a secondary coil 702, and a tertiary coil 703. The primary coil 701 and the secondary coil 702 are Y-connected. The tertiary coil 703 is Δ-connected. Neutral points of the primary coil 701 and the secondary coil 702 are grounded.

The first breaker 3a is a breaker which operates each of main contacts 31Ua, 31Va, and 31Wa for the U phase, V phase, and W phase. The first breaker 3a is provided with auxiliary switches 32Ua, 32Va, and 32Wa which operate in association with opening/closing statuses of the main contacts 31Ua, 31Va, and 31Wa. Auxiliary switches 32Ua to 32Wa each output an auxiliary switch signal indicating an opening status or a closing status of each of respectively corresponding contact points 31Ua to 31Wa, to each of two excitation inrush-current suppression apparatuses 9a and 9b. By closing the first breaker 3a when the second breaker 3b is open, the transformer 7 is powered on through the first power supply bus 2a. By opening the first breaker 3a when the second breaker 3b is open, the transformer 7 is disconnected from the power supplies.

The second breaker 3b is a breaker which operates each of main contacts 31Ub, 31Vb, and 31Wb for the U phase, V phase, and W phase. The second breaker 3b is provided with auxiliary switches 32Ub, 32Vb, and 32Wb which operate in association with opening/closing statuses of the main contacts 31Ub, 31Vb, and 31Wb. Auxiliary switches 32Ub, 32Vb, and 32Wb each output an auxiliary switch signal indicating an opening status or a closing status of each of respectively corresponding main contacts 31Ub, 31Vb, and 31Wb, to each of the two excitation inrush-current suppression apparatuses 9a and 9b. By closing the second breaker 3b when the first breaker 3a is open, the transformer 7 is powered on through the second power supply bus 2a. By opening the second breaker 3b when the first breaker 3a is open, the transformer 7 is disconnected from the power supplies.

First power-supply voltage detectors 5Ua, 5Va, and 5Wa are provided for the respective phases (U phase, V phase, W phase) of the first power supply bus 2a. The first power-supply voltage detectors 5Ua, 5Va, and 5Wa are devices used for meters to measure phase voltages (voltage to ground) of the respective phases of the first power supply bus 2a. The first power-supply voltage detector 5Ua, 5Va, and 5Wa are, for example, voltage dividers such as voltage transformers (VT) used for meters or a capacitance potential device (PD). The first power-supply voltage detectors 5Ua, 5Va, and 5Wa are connected between the respective phases of the first power supply bus 2a and the ground. The first power-supply voltage detectors 5Ua, 5Va, and 5Wa output detected values as detection signals to the first excitation inrush-current suppression apparatus 9a.

Second power-supply voltage detectors 5Ub, 5Vb, and 5Wb are provided for the respective phases (U phase, V phase, and W phase) of the second power supply bus 2b. The second power-supply voltage detectors 5Ub, 5Vb, and 5Wa are devices used for meters to measure phase voltages of the respective phases of the first power supply bus 2b. Power-supply voltage detectors 5Ub, 5Vb, and 5Wb are, for example, voltage dividers such as voltage transformers or capacitance potential devices. The second power-supply voltage detectors 5Ub, 5Vb, and 5Wb are connected between the respective phases of the first power supply bus 2b and the ground. The second power-supply voltage detectors 5Ub, 5Vb, and 5Wb output detected values as detection signals to the second excitation inrush-current suppression apparatus 9b.

The transformer-terminal voltage detectors 8U, 8V, and 8W are voltage transformers to measure the phase voltages Vu, Vv, and Vw of respective terminals (U phase, V phase, and W phase) on the primary side of the transformer 7. The transformer-terminal voltage detectors 8U, 8V, and 8W are, for example, voltage dividers such as voltage transformers or capacitance potential devices. The transformer-terminal voltage detectors 8U, 8V, and 8W are provided for each of the respective phases of the primary terminal of the transformer 7. The transformer-terminal voltages detectors 8U, 8V, and 8W output detected values as detection signals to the first excitation inrush-current suppression apparatus 9a and second excitation inrush-current suppression apparatus 9b.

The first excitation-inrush-current suppression apparatus 9a outputs close commands to the main contacts 31Ua, 31Va, and 31Wa of the respective phases of the first breaker 3a, based on the detection signals received from the first power-supply voltage detectors 5Ua, 5Va, and 5Wa and the transformer-terminal voltage detectors 8U, 8V, and 8W. In this manner, the first breaker 3a is closed.

The second excitation-inrush-current suppression apparatus 9b outputs close commands to the main contacts 31Ub, 31Vb, and 31Wb of the respective phases of the second breaker 3b, based on the detection signals received from the first power-supply voltage detectors 5Ub, 5Vb, and 5Wb and the transformer-terminal voltage detectors 8U, 8V, and 8W. In this manner, the second breaker 3b is closed.

With reference to FIGS. 1, 2, 3, and 4, configurations of the excitation-inrush-current suppression apparatuses 9a and 9b will now be described.

Figure 2:
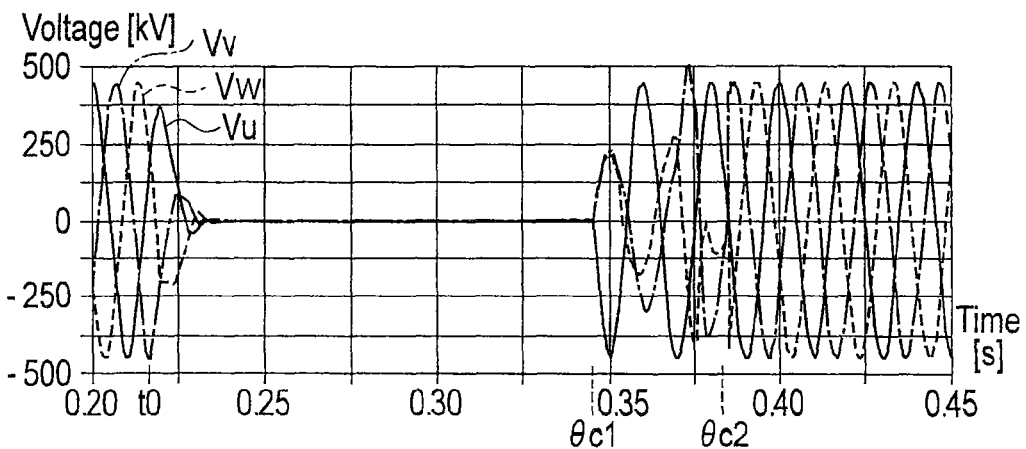
FIG. 2 is a waveform chart showing changes of phase voltages of a transformer from the power-off of the transformer to the power-on of the transformer by a first breaker according to the first embodiment.
Figure 3:
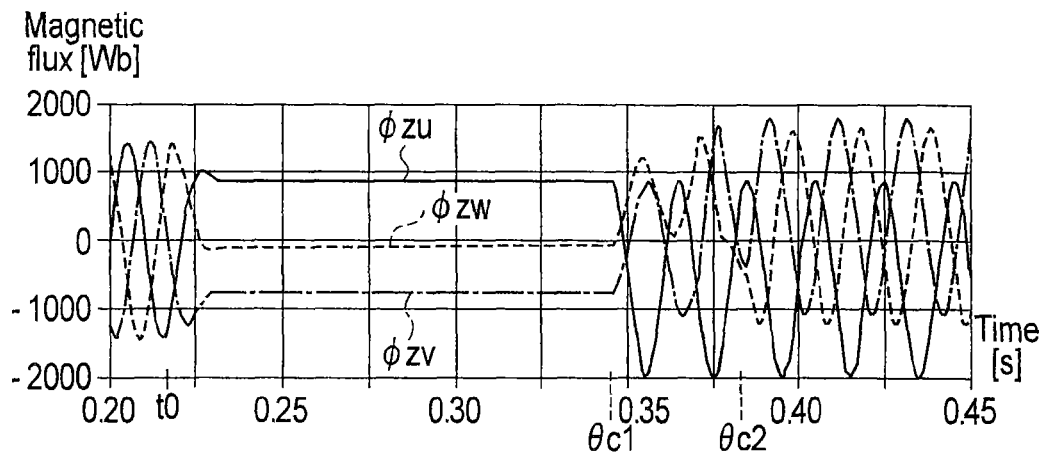
FIG. 3 is a waveform chart showing changes of residual magnetic fluxes of an iron core of the transformer from the power-off of the transformer to the power-on of the transformer by the first breaker according to the first embodiment.
Figure 4:
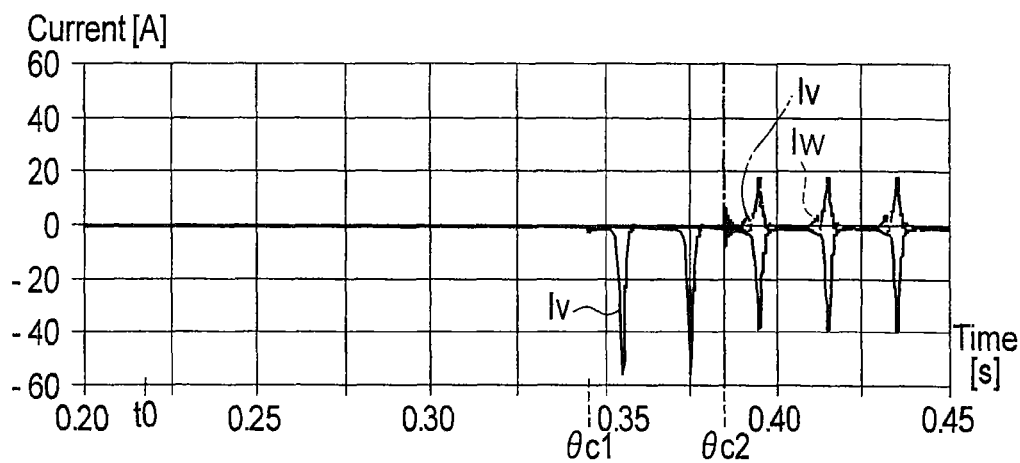
FIG. 4 is a waveform chart showing changes of breaker currents which flow through the first breaker from the power-off of the transformer to the power-on of the transformer by the first breaker, according to the first embodiment.

FIGS. 2, 3, and 4 show statuses from the power-off of the transformer 7 to the power-on of the transformer 7 by the first breaker 3a. FIG. 2 is a waveform chart showing changes of phase voltages Vu, Vv, and Vw of the transformer 7. FIG. 3 is a waveform chart showing changes of residual magnetic fluxes φZu, φZv, and φZw of the transformer 7. FIG. 4 is a waveform chart showing changes of breaker currents Iu, Iv, and Iw which flow through the first breaker 3a. A time t0 indicates a power-off time (the time point when the breaker 3 is opened) of the transformer 7.

The configuration of the first excitation-inrush-current suppression apparatus 9a will be described first.

The first excitation inrush-current suppression apparatus 9a comprises a power-supply-voltage measurement unit 901a, a transformer-voltage measurement unit 902a, a residual magnetic flux calculation unit 903a, a transformer power-off detection unit 904a, a phase detection unit 905a, and a close-command output unit 906a.

The power-supply-voltage measurement unit 901a measures phase voltages V1u, V1v, and V1w of the first power supply bus 2a, based on the detection signals detected by the first power-supply-voltage detectors 5Ua, 5Va, and 5Wa. The power-supply-voltage measurement unit 901a outputs measured phase voltages V1u, V1v, and V1w to the phase detection unit 905a.

The transformer-voltage measurement unit 902a measures phase voltages Vu, Vv, and Vw on the primary side of the transformer 7, based on the detection signals detected by the transformer-terminal voltage detectors 8U, 8V, and 8W. The transformer-voltage measurement unit 902a outputs measured phase voltages Vu, Vv, and Vw on the primary side of the transformer 7, to the residual magnetic flux calculation unit 903a.

The transformer power-off detection unit 904a receives the auxiliary switch signals output respectively from auxiliary switches 32Ua, 32Va, and 32Wa of the first breaker 3a and auxiliary switches 32Ub, 32Vb, and 32Wb of the second breaker 3b. The transformer power-off detection unit 904a detects that the transformer 7 is disconnected from the power supplies (i.e., the first power supply bus 2a and the second power supply bus 2b), based on the input auxiliary switch signals of the first breaker 3a and the second breaker 3b. Specifically, if the auxiliary switch signals of the first breaker 3a and the second breaker 3b indicate opened statuses, the transformer power-off detection unit 904a determines that the transformer 7 is disconnected from the power supplies. When the transformer power-off detection unit 904a detects that the transformer 7 is disconnected from the power supplies, the transformer power-off detection unit 904a outputs a detection signal to the residual magnetic flux calculation unit 903a.

Alternatively, the transformer power-off detection unit 904a may detect the disconnection of the transformer 7 from the power supplies, based on the auxiliary switch signals of the first breaker 3a or second breaker 3b and based on the phase voltages Vu, Vv, and Vw of the transformer. For example, if an auxiliary switch signal of the first breaker 3a (or second breaker 3b) changes to indicate an opening status from a closing status and if phase voltages Vu, Vv, and Vw of the transformer 7 go to substantial zero, the transformer 7 may be determined to be disconnected from the power supplies.

The residual magnetic flux calculation unit 903a integrates each of the phase voltages Vu, Vv, and Vw of U, V, and W phases after the disconnection of the transformer 7 from the power supplies by the first breaker 3a, based on phase voltages Vu, Vv, and Vw measured by the transformer-voltage measurement unit 902a, respectively. The residual magnetic flux calculation unit 903a fixes integration values of the respective phase voltages Vu, Vv, and Vw at the time of detecting the disconnection of the transformer 7 from the power supplies (namely, opening of the first breaker 3a or the second breaker 3b) by the transformer power-off detection unit 904a. The residual magnetic flux calculation unit 903a sets the fixed integration values as residual magnetic fluxes (phase magnetic fluxes on the primary side) φZu, φZv, and φZw of the iron core of the transformer 7. The residual magnetic flux calculation unit 903a outputs calculated magnetic fluxes φZu, φZv, and φZw to the phase detection unit 905a.

The magnetic fluxes φZu, φZv, and φZw of the respective phases calculated by the residual magnetic flux calculation unit 903a and the phase voltages V1u, V1v, and V1w of the first power supply bus 2a measured by the power-supply-voltage measurement unit 901a are input to the phase detection unit 905a. The phase detection unit 905a detects a specific phase, which is a phase having the maximum or minimum absolute value among the residual magnetic fluxes φZu, φZv, and φZw of the respective phases. Alternatively, the phase detection unit 905a may constantly take, as the specific phase, a phase having either the maximum or minimum absolute value.

If a phase having the maximum absolute value is taken as the specific phase, the phase detection unit 905a detects the phase at a zero point at which the voltage of the specific phase changes from the same polarity as the residual magnetic flux of the specific phase to the opposite polarity, among the detected phase voltages V1u, V1v, and V1w of the first power supply bus 2a. Otherwise, if a phase having the minimum absolute value is taken as the specific phase, the phase detection unit 905a detects, as a target closing phase θc1, a phase at which the voltage of the specific phase is a wave height value, among the detected phase voltages V1u, V1v, and V1w of the first power supply bus 2a. The phase detection unit 905a outputs the detected specific phase and the target closing phase θc1 to the close-command output unit 906a.

Here, a reason for determining the target closing phase θc1 described above will now be described below.

If the phase of a residual magnetic flux having a maximum absolute value is taken as the specific phase, the residual magnetic flux of the specific phase has a value near the wave height value. Further, a prospective magnetic flux which integrates a voltage is delayed by 90 degrees from the voltage. Accordingly, both the residual magnetic flux and prospective magnetic flux have values near a wave height value by closing the first breaker 3a at a phase of a zero point at which the voltage of the specific phase changes from the same polarity as the residual magnetic flux to the opposite polarity. That is, a difference decreases between the residual magnetic flux of the specific phase and the prospective magnetic flux. Therefore, the excitation inrush current of the specific phase is suppressed.

If the phase of a residual magnetic flux having a minimum absolute value is taken as the specific phase, the residual magnetic flux of the specific phase has a value near the zero point. Accordingly, both the residual magnetic flux and the prospective magnetic flux have values near the zero point by closing the first breaker 3a at a phase at which the voltage of the specific phase reaches the wave height value. That is, the difference decreases between the residual magnetic flux of a view phase and the prospective magnetic flux thereof. Therefore, the excitation inrush current of the specific phase is suppressed.

If the transformer 7 is powered on when the first breaker 3a is closed (for example, if the first breaker 3a is closed when the auxiliary switch signal of the second breaker 3b indicates an opening status), the close-command output unit 906a closes only the specific phase of the first breaker 3a at the target closing phase θc1 detected by the phase detection unit 905a. After closing the specific phase of the first breaker 3a, the close-command output unit 906a closes the remaining two phases other than the specific phase of the first breaker 3a at a target closing phase θc2. The target closing phase θc2 is a phase at the zero point of the phase voltage of the specific phase after elapse of a preset time from the target closing phase θc1 of the specific phase. By closing the remaining two phases other than the specific phase of the first breaker 3a at the target closing phase θc2, the excitation inrush current which is generated at the time of closing these two phases is also suppressed.

If the transformer 7 is already powered on (for example, if the first breaker 3a is closed when the auxiliary switch signal of the second breaker 3b indicates an opening status), the close-command output unit 906a closes only the first breaker 3a with the first power-supply bus 2a and the second power-supply bus 2b synchronized with each other. In this case, the close-command output unit 906a may close the first breaker 3a in each of phases in any manner.

The close-command output unit 906a outputs close commands to the operation mechanism to drive the main contact of a phase of the first breaker 3a to be closed, based on the target closing phases θc1 and θc2. In this manner, the main contact of the phase of the first breaker 3a to be closed is closed.

If the phase of the residual magnetic flux having a maximum absolute value is taken as the specific phase, the absolute value of the residual magnetic flux of the U phase is the greatest in FIG. 3. Therefore, the specific phase is the U phase. By closing the specific phase of the first breaker 3a at the target closing phase θc1 and by closing the remaining two phases other than the specific phase of the first breaker 3a at the target closing phase θc2, as shown in FIG. 4, the breaker currents (excitation inrush currents) Iu, Iv, and Iw of the respective phase are suppressed to about several ten ampere which is smaller than a rated current.

Next, the configuration of the first excitation-inrush-current suppression apparatus 9b will now be described. Since the second excitation-inrush-current suppression apparatus 9b is configured in the same manner as the first excitation-inrush-current suppression apparatus 9a, descriptions will be mainly made of components different from the first excitation-inrush-current suppression 9a.

The second excitation-inrush-current suppression apparatus 9b comprises a power-supply-voltage measurement unit 901b, a transformer-voltage measurement unit 902b, a residual magnetic flux calculation unit 903b, a transformer power-off detection unit 904b, a phase detection unit 905b, and a close-command output unit 906b.

The power-supply-voltage measurement unit 901b measures phase voltages V2u, V2v, and V2w of the first power supply bus 2b, based on the detection signals detected by the second power-supply-voltage detectors 5Ub, 5Vb, and 5Wb. The power-supply-voltage measurement unit 901b outputs measured phase voltages V2u, V2v, and V2w to the phase detection unit 905b.

The transformer-voltage measurement unit 902b measures phase voltages Vu, Vv, and Vw on the primary side of the transformer 7, based on the detection signals detected by the transformer-terminal voltage detectors 8U, 8V, and 8W, like the transformer-voltage measurement unit 902a of the first excitation-inrush-current suppression apparatus 9a. The transformer-voltage measurement unit 902b outputs measured phase voltages Vu, Vv, and Vw on the primary side of the transformer 7, to the residual magnetic flux calculation unit 903b.

The transformer power-off detection unit 904b detects the disconnection of the transformer 7 from the power supplies, based on auxiliary switch signals output respectively from auxiliary switches 32Ua, 32Va, and 32Wa of the first breaker 3a and auxiliary switches 32Ub, 32Vb, and 32Wb of the second breaker 3b, like the transformer power-off detection unit 904a of the first excitation-inrush-current suppression apparatus 9a. When the transformer power-off detection unit 904b detects the disconnection of the transformer 7 from the power supplies, the transformer power-off detection unit 904b then outputs a detection signal to the residual magnetic flux calculation unit 903b.

The residual magnetic flux calculation unit 903b calculates residual magnetic fluxes φZu, φZv, and φZw of the iron core of the transformer 7, based on phase voltages Vu, Vv, and Vw measured by the transformer voltage measurement unit 902b, like the residual magnetic flux calculation unit 903a of the first excitation-inrush-current suppression apparatus 9a. The residual magnetic flux calculation unit 903b outputs calculated magnetic fluxes φZu, φZv, and φZw to the phase detection unit 905b.

The phase detection unit 905b detects a specific phase of the three phases and a target closing phase θc1, based on residual magnetic fluxes φZu, φZv, and φZw, like the phase detection unit 905a of the first excitation-inrush-current suppression apparatus 9a. The phase detection unit 905b outputs the detected specific phase and the target closing phase θc1 to the close-command output unit 906b.

If the transformer 7 is powered on when the second breaker 3b is closed (for example, if the second breaker 3b is closed when the auxiliary switch signal of the first breaker 3a indicates an opening status), the close-command output unit 906b closes the specific phase of the second breaker 3b at the target closing phase θc1 detected by the phase detection unit 905b, and closes the remaining two phases other than the specific phase of the second breaker 3b at the target closing phase θc2 after elapse of a preset time, like the close-command output unit 906a of the first excitation-inrush-current suppression apparatus 9a.

In this manner, when the second breaker 3b is closed by the second excitation-inrush-current suppression apparatus 9b, the excitation inrush current of the transformer 7 is suppressed, like the first excitation-inrush-current suppression apparatus 9a.

If the transformer 7 is already powered on (for example, if the second breaker 3b is closed when the auxiliary switch signal of the first breaker 3a indicates a closing status), the close-command output unit 906b closes the second breaker 3b, like the close-command output unit 906a of the first excitation-inrush-current suppression apparatus 9a.

According to the present embodiment, even with the system configuration which powers on the transformer 7 by the two breakers 3a and 3b, residual magnetic fluxes φZu, φZv, and φZw can be calculated by the excitation inrush-current suppression apparatuses 9a and 9b provided respectively for the two breakers 3a and 3b, irrespective of an order of opening the breakers 3a and 3b. Accordingly, the excitation-inrush-current suppression apparatuses 9a and 9b can suppress the excitation inrush current of the transformer 7 to be generated when the transformer 7 is powered on, irrespective of whether the transformer 7 is disconnected from the power supplies by the breaker 3a or 3b.

Second Embodiment

FIG. 5 shows a configuration of an excitation-inrush-current suppression system 1A according to the second embodiment of the invention.

In the excitation-inrush-current suppression system 1A, the two excitation-inrush-current suppression apparatuses 9a and 9b in the excitation-inrush-current suppression system 1 according to the first embodiment shown in FIG. 1 are respectively replaced with two excitation-inrush-current suppression apparatuses 9aA and 9bA. The two excitation-inrush-current suppression apparatuses 9aA and 9bA are connected through a transfer path for transferring data. The other features of the configuration are the same as those of the excitation-inrush-current suppression system 1 according to the first embodiment.

In the first excitation-inrush-current suppression apparatus 9aA, the residual magnetic flux calculation unit 903a, the transformer power-off detection unit 904a, and the phase detection unit 905a of the first excitation-inrush-current suppression apparatus 9a in FIG. 1 are replaced respectively with a residual magnetic flux calculation unit 903aA, a transformer power-off detection unit 904aA, and a phase detection unit 905aA. The other features of the configuration are the same as those of the first excitation-inrush-current suppression apparatus 9a according to the first embodiment.

In the second excitation-inrush-current suppression apparatus 9bA, the residual magnetic flux calculation unit 903b, the transformer power-off detection unit 904b, and the phase detection unit 905b of the second excitation inrush-current suppression apparatus 9b in FIG. 1 are replaced respectively with a residual magnetic flux calculation unit 903bA, a transformer power-off detection unit 904bA, and a phase detection unit 905bA. The other features of the configuration are the same as those of the second excitation-inrush-current suppression apparatus 9b according to the first embodiment.

The transformer power-off detection unit 904aA of the first excitation-inrush-current suppression apparatus 9aA receives auxiliary switch signals output from auxiliary switches 32Ua, 32Va, and 32Wa of the first breaker 3a. The transformer power-off detection unit 904aA detects that the transformer 7 has been disconnected from the power supplies, based on the input auxiliary switch signal of the first breaker 3a. Specifically, if the auxiliary switch signal of the first breaker 3a changes to indicate an opening status from a closing status, the transformer power-off detection unit 904aA detects the disconnection of the transformer 7 from the power supplies. At this time, even if the second breaker 3b has been closed and if the transformer 7 has not been actually disconnected from the power supplies, the disconnection of the transformer 7 from the power supplies may be detected. Only if the transformer 7 is actually disconnected from the power supplies, the disconnection of the transformer 7 from the power supplies may be determined. When the transformer power-off detection unit 904aA detects the disconnection of the transformer 7 from the power supplies, the transformer power-off detection unit 904aA outputs a detection signal to the residual magnetic flux calculation unit 903aA.

The transformer power-off detection unit 904bA of the second excitation-inrush-current suppression apparatus 9bA receives auxiliary switch signals output from auxiliary switches 32Ub, 32Vb, and 32Wb of the second breaker 3b. The transformer power-off detection unit 904bA detects the disconnection of the transformer 7 from the power supplies, like the transformer power-off detection unit 904aA of the first excitation-inrush-current suppression apparatus 9aA. Specifically, if the auxiliary switch signal of the first breaker 3b changes so as to indicate an opening status from a closing status, the transformer power-off detection unit 904bA detects the disconnection of the transformer 7 from the power supplies. When the transformer power-off detection unit 904bA detects the disconnection of the transformer 7 from the power supplies, the transformer power-off detection unit 904bA outputs a detection signal to the residual magnetic flux calculation unit 903bA.

The residual magnetic flux calculation unit 903aA of the first excitation-inrush-current suppression apparatus 9aA integrates each of the phase voltages Vu, Vv, and Vw after the disconnection of the transformer 7 from the power supplies by the first breaker 3a, based on the phase voltages Vu, Vv, and Vw measured by the transformer-voltage measurement unit 902a, respectively. If the phase voltages Vu, Vv, and Vw become approximately zero at the time point when the transformer power-off detection unit 904aA detects the disconnection of the transformer 7 from the power supplies (namely, if the transformer 7 is actually disconnected from the power supplies), the residual magnetic flux calculation unit 903aA fixes the integration values of the phase voltages Vu, Vv, and Vw of the transformer 7. If the phase voltages Vu, Vv, and Vw do not become approximately zero at the time point when the transformer power-off detection unit 904aA detects the disconnection of the transformer 7 from the power supplies (namely, if the transformer 7 is not actually disconnected from the power supplies), the residual magnetic flux calculation unit 903aA fixes the integration values of the phase voltages Vu, Vv, and Vw of the transformer 7. The residual magnetic flux calculation unit 903aA outputs the fixed integration values to the phase detection unit 905aA and the phase detection unit 905bA of the second excitation-inrush-current suppression apparatus 9bA, as residual magnetic fluxes φZu, φZv, and φZw of the iron core of the transformer 7. The output of the phase detection unit 905bA of the second excitation-inrush-current suppression apparatus 9bA is performed through a transfer path. The other features of the configuration are the same as those of the first residual magnetic flux calculation unit 903a according to the first embodiment.

The residual magnetic flux calculation unit 903bA of the second excitation-inrush-current suppression apparatus 9bA fixes residual magnetic fluxes φZu, φZv, and φZw of the iron core of the transformer 7, like the residual magnetic flux calculation unit 903aA of the first excitation-inrush-current suppression apparatus 9aA. The residual magnetic flux calculation unit 903bA outputs the fixed residual magnetic fluxes φZu, φZv, and φZw to the phase detection unit 905bA and the phase detection unit 905aA of the first excitationinrush-current suppression apparatus 9aA. The output of the phase detection unit 905aA of the first excitation-inrush-current suppression apparatus 9aA is performed through a transfer path.

The phase detection unit 905aA of the first excitation-inrush-current suppression apparatus 9aA is input with fixed residual magnetic fluxes φZu, φZv, and φZw from either the residual magnetic flux calculation unit 903aA or the residual magnetic flux calculation unit 903bA of the second excitation-inrush-current suppression apparatus 9aA. The phase detection unit 905aA detects a specific phase of the three phases and the target closing phase θc1, based on the input residual magnetic fluxes φZu, φZv, and φZw and the respective phase voltages V1u, V1v, and V1w of the first power supply bus 2a measured by the power-supply-voltage measurement unit 901a, like the phase detection unit 905a according to the first embodiment. The phase detection unit 905aA outputs the detected specific phase and the target closing phase θc1 to the close-command output unit 906a. The other features of the configuration are the same as those of the phase detection unit 905a according to the first embodiment.

The phase detection unit 905bA of the second excitation-inrush-current suppression apparatus 9bA detects the specific phase and the target closing phase θc1, like the phase detection unit 905aA of the first excitation-inrush-current suppression apparatus 9aA. The phase detection unit 905bA outputs the detected specific phase and target closing phase θc1 to the close-command output unit 906b.

According to the present embodiment, the same functions and effects as the first embodiment can be achieved by the configuration in which the two excitation inrush-current suppression apparatus 9a and 9b respectively receive auxiliary switch signals from only the breakers 3a and 3b as operation targets to be operated.

Third Embodiment

Figure 6:
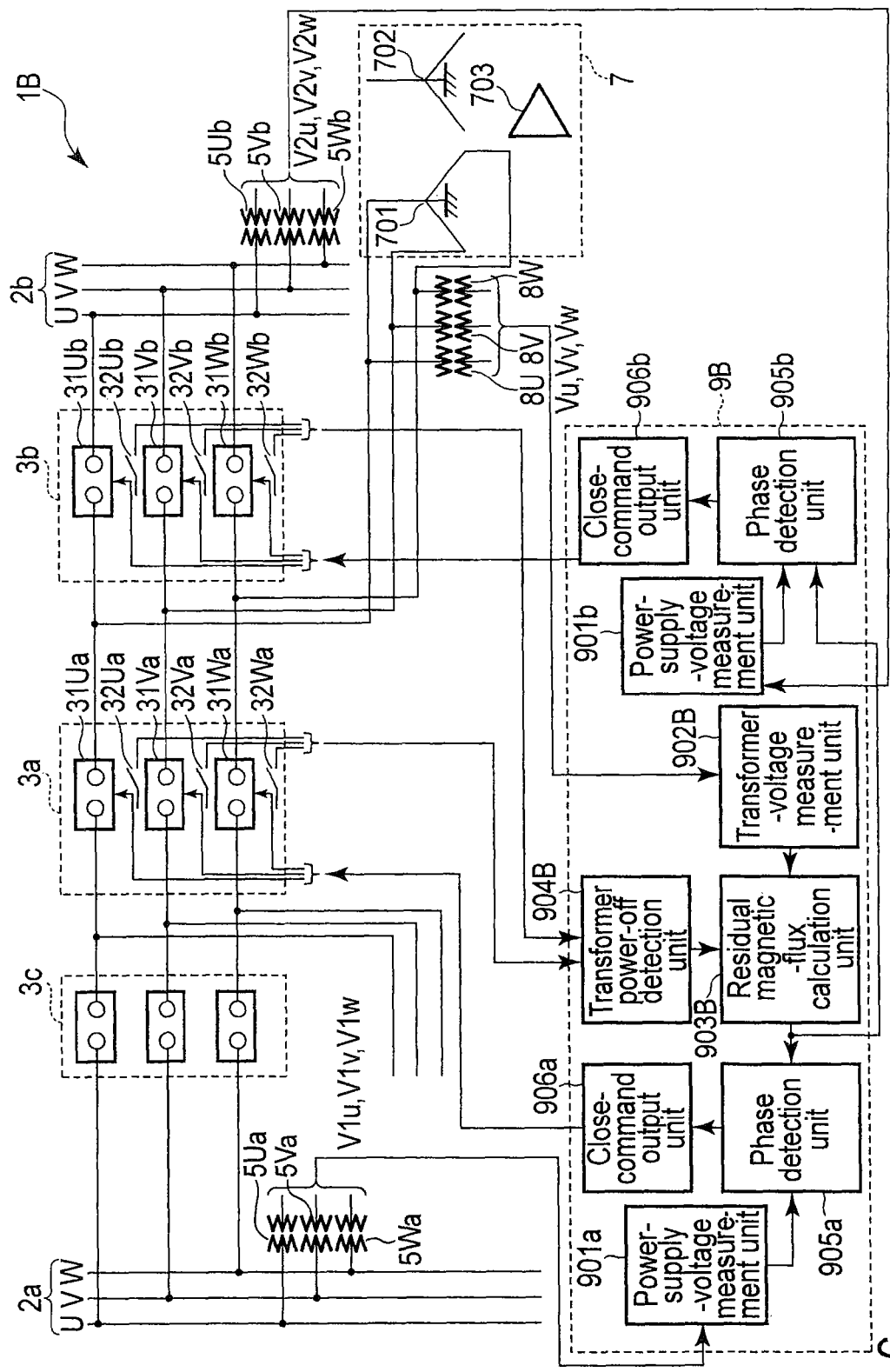
FIG. 6 shows a configuration of an excitation inrush-current suppression system according to a third embodiment of the invention.

FIG. 6 shows a configuration of an excitation-inrush-current suppression system 1B according to the third embodiment of the invention.

In the excitation-inrush-current suppression system 1B, the two excitation-inrush-current suppression apparatuses 9a and 9b in the excitation-inrush-current suppression system 1 according to the first embodiment shown in FIG. 1 are replaced with one excitation-inrush-current suppression apparatus 9B. The other features of the configuration are the same as those of the excitation-inrush-current suppression system 1 according to the first embodiment.

The excitation-inrush-current suppression apparatus 9B comprises two power-supply-voltage measurement units 901a and 901b, a transformer-voltage measurement unit 902B, a residual magnetic flux calculation unit 903B, a transformer power-off detection unit 904B, two phase detection units 905a and 905b, and two close-command output units 906a and 906b.

The power-supply-voltage measurement unit 901a is the same as the power-supply-voltage measurement unit 901a of the first excitation-inrush-current suppression apparatus 9a according to the first embodiment. The power-supply-voltage measurement unit 901a outputs measured phase voltages V1u, V1v, and V1w to the phase detection unit 905a.

The power-supply-voltage measurement unit 901b is the same as the power-supply-voltage measurement unit 901b of the second excitation-inrush-current suppression apparatus 9b according to the first embodiment. The power-supply-voltage measurement unit 901b outputs measured phase voltages V2u, V2v, and V2w to the phase detection unit 905b.

The transformer-voltage measurement unit 902B has a configuration in which transformer-voltage measurement units 902a and 902b in each of the two excitation-inrush-current suppression apparatuses 9a and 9b according to the first embodiment are integrated into one unit. The transformer-voltage measurement unit 902B outputs measured phase voltages Vu, Vv, and Vw on the primary side of the transformer 7 to the residual magnetic flux calculation unit 903B, like the transformer-voltage measurement units 902a and 902b according to the first embodiment.

The transformer power-off detection unit 904B has a configuration in which the transformer power-off detection units 904a and 904b in each of the two excitation-inrush-current suppression apparatuses 9a and 9b according to the first embodiment are integrated into one unit. The transformer power-off detection unit 904B outputs a detection signal to the residual magnetic flux calculation unit 903B, when the transformer power-off detection unit 904B detects the disconnection of the transformer 7 from the power supplies, based on each of auxiliary switch signals of the first breaker 3a and the second breaker 3b, like the transformer power-off detection units 904a and 904b according to the first embodiment.

The residual magnetic flux calculation unit 903B has a configuration in which the residual magnetic flux calculation units 903a and 903b in each of the two excitation-inrush-current suppression apparatuses 9a and 9b according to the first embodiment are integrated into one unit. The residual magnetic flux calculation unit 903B calculates the residual magnetic fluxes φZu, φZv, and φZw of the respective phases after the disconnection of the transformer 7 from the power supplies by the first breaker 3a or the second breaker 3b, like the residual magnetic flux calculation units 903a and 903b according to the first embodiment. The residual magnetic flux calculation unit 903B outputs calculated magnetic fluxes φZu, φZv, and φZw, according to the two phase detection units 905a and 905b.

The phase detection unit 905a is the same as the phase detection unit 905a of the first excitation-inrush-current suppression apparatus 9a according to the first embodiment. The phase detection unit 905a detects a specific phase of the three phases and the target closing phase θc1 to close the first breaker 3a, based on each of the residual magnetic fluxes φZu, φZv, and φZw calculated by the residual magnetic flux calculation unit 903B and the phase voltages V1u, V1v, and V1w of the first power supply bus 2a measured by the power-supply-voltage measurement unit 901a.

The phase detection unit 905b is the same as the phase detection unit 905b of the first excitation-inrush-current suppression apparatus 9b according to the first embodiment. The phase detection unit 905b detects a specific phase of the three phases and the target closing phase θc1 to close the second breaker 3b, based on each of the residual magnetic fluxes φZu, φZv, and φZw calculated by the residual magnetic flux calculation unit 903B and the phase voltages V2u, V2v, and V2w of the second power supply bus 2b measured by the power-supply-voltage measurement unit 901b.

The close-command output unit 906a is the same as the close-command output unit 906a of the first excitation-inrush-current suppression apparatus 9a according to the first embodiment. If the transformer 7 is powered on, the close-command output unit 906a closes the first breaker 3a through two steps, based on the specific phase and the target closing phase θc1 detected by the phase detection unit 905a, as described in the first embodiment.

The close-command output unit 906b is the same as the close-command output unit 906b of the first excitation-inrush-current suppression apparatus 9b according to the first embodiment. If the transformer 7 is powered on, the close-command output unit 906b closes the second breaker 3b through two steps, based on the specific phase and the target closing phase θc1 detected by the phase detection unit 905b, as described in the first embodiment.

According to the present embodiment, the same functions and effects as the first embodiment can be achieved by providing one excitation inrush-current suppression apparatus 9B in place of the two excitation inrush-current suppression apparatuses 9a and 9b according to the first embodiment.

In each of the above embodiments, various parameters in phase control by the excitation-inrush-current suppression apparatuses 9a, 9b, 9aA, 9bA, and 9B may be corrected to further improve accuracy. For example, when closing the breakers 3a and 3b, the closing time may vary due to an advance discharge, referred to as pre-arc, which is generated between main contacts, or due to operational variations of the operation mechanism. By obtaining properties of closing variations due to the pre-arc and variations at the time of closing breakers in advance, corrections can be made based on the properties. By making such corrections, an excitation inrush current can be controlled more steadily even when such variations occur.

Also, each of the above embodiments has been described with reference to a power system having a common 1½ bus configuration. However, the invention is not limited to this configuration. The power system may be of any type insofar as the power system applies the transformer 7 to two or more power supplies (power supply buses 2a and 2b) by two or more breakers. For example, the third breaker 3c may be omitted from each of the embodiments.

Yet also in each of the embodiments, the phase voltages V1u, V1v, and V1w and V2u, V2v, and V2w of the power supply buses 2a and 2b are measured by the power-supply voltage detectors 5Ua, 5Va, and 5Wa and 5Ub, 5Vb, and 5Wb, respectively. However, line voltages between the power supply buses 2a and 2b may be measured and converted into phase voltages Vu, Vv, and Vw. Similarly, the phase voltages Vu, Vv, and Vw on the primary side of the transformer 7 are measured by the transformer terminal-voltage detectors 8U, 8V, and 8W. The invention is, however, not limited to the above embodiments. The phase voltages Vu, Vv, and Vw of the transformer 7 may be the phase voltages of the secondary coil 702 or may be phase voltages into which interline voltages of the tertiary coil 703 of Δ connection are converted.

Also, in each of the embodiments, the transformer 7 may be of any type insofar as the transformer 7 is a three-phase transformer which transforms three-phase alternating current voltages into three-phase alternating current voltages. Therefore, the transformer 7 is not limited to three coils but may be two coils or may be four or more coils. The connection types of each of the coils may be any of Y connection and Δ connection, and may be combined arbitrarily.

In each of the embodiments, insofar as the same result is obtained, the order or spots of calculations may be arbitrarily changed. The places where calculations are performed may be either inside or outside of the excitation-inrush-current suppression apparatuses 9a, 9b, 9aA, 9bA, and 9B. The calculations may be performed by various detectors.

In each of the embodiments, each of the excitation-inrush-current suppression systems 1 to 1B are configured by one or two of the excitation-inrush-current suppression apparatuses 9a and 9b, 9aA, 9bA, and 9B. The systems 1 to 1B may be configured by any number of excitation-inrush-current suppression apparatuses.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An excitation-inrush-current suppression system that suppresses an excitation inrush current of a transformer connected through a first breaker to a first power supply and connected through a second breaker to a second power supply, the system comprising:

a transformer-voltage measurement unit configured to measure three-phase alternating-current voltages of the transformer;

a transformer power-off detection unit configured to detect that the transformer is disconnected from the power supplies;

a residual magnetic flux calculation unit configured to calculate residual magnetic fluxes of three phases of the transformer, based on the three-phase alternating-current voltages measured by the transformer-voltage measurement unit, when the transformer is detected to be disconnected from the power supplies by the transformer power-off detection unit;

a first power-supply-voltage measurement unit configured to measure three-phase alternating-current voltages of the first power supply;

a first closing unit configured to close a specific phase of the three phases of the first breaker at a first closing phase for suppressing an excitation inrush current, the specific phase being either a phase having a maximum absolute value or a minimum absolute value among the residual magnetic fluxes of the three phases, based on the residual magnetic fluxes of the three phases of the transformer calculated by the residual magnetic flux calculation unit and the three-phase alternating-current voltages of the first power supply measured by the first power-supply-voltage measurement unit;

a second closing unit configured to close two phases other than the specific phase of the first breaker, at a second closing phase for suppressing an excitation inrush current, after closing the specific phase of the first breaker by the first closing unit;

a second power-supply-voltage measurement unit configured to measure three-phase alternating-current voltages of the second power supply;

a third closing unit configured to close a specific phase of the three phases of the second breaker at a third closing phase for suppressing an excitation inrush current, the specific phase being either a phase having a maximum absolute value or a minimum absolute value among the residual magnetic fluxes of the three phases, based on the residual magnetic fluxes of the three phases of the transformer calculated by the residual magnetic flux calculation unit and the three-phase alternating-current voltages of the second power supply measured by the second power-supply-voltage measurement unit; and
a fourth closing unit configured to close two phases other than the specific phase of the second breaker, at a fourth closing phase for suppressing an excitation inrush current, after closing the specific phase of the second breaker by the third closing unit.

2. The excitation-inrush-current suppression system of claim 1, further comprising:
a first excitation-inrush-current suppression apparatus; and
a second excitation-inrush-current suppression apparatus, wherein
the first excitation inrush-current suppression apparatus comprises
a first transformer-voltage measurement unit as the transformer-voltage measurement unit,
a first transformer power-off detection unit as the transformer power-off detection unit,
a first residual magnetic flux calculation unit as the residual magnetic flux calculation unit,
the first power-supply-voltage measurement unit,
the first closing unit, and
the second closing unit, and
the second excitation-inrush-current suppression apparatus comprises
a second transformer-voltage measurement unit as the transformer-voltage measurement unit,
a second transformer power-off detection unit as the transformer power-off detection unit,
a second residual magnetic flux calculation unit as the residual magnetic flux calculation unit,
the second power-supply-voltage measurement unit,
the third closing unit, and
the fourth closing unit.

3. The excitation-inrush-current suppression system of claim 1, wherein
the transformer power-off detection unit determines that the transformer is disconnected from the power supplies, when a signal indicating an opening status is received from each of the first breaker and the second breaker.

4. An excitation-inrush-current suppression system that suppresses an excitation inrush current of a transformer connected through a first breaker to a first power supply and connected through a second breaker to a second power supply, the system comprising:
a first excitation-inrush-current suppression apparatus; and
a second excitation-inrush-current suppression apparatus, wherein
the first excitation inrush-current suppression apparatus comprises
a first transformer-voltage measurement unit configured to measure three-phase alternating-current voltages of the transformer,
a first transformer power-off detection unit configured to detect that the transformer is disconnected from the power supplies by the first breaker,
a first residual magnetic flux calculation unit configured to calculate residual magnetic fluxes of three phases of the transformer, based on the three-phase alternating-current voltages measured by the first transformer-voltage measurement unit, when the transformer is detected to be disconnected from the power supplies by the first transformer power-off detection unit,
a first residual magnetic flux transmission unit configured to transmit the residual magnetic fluxes of the three phases of the transformer calculated by the first residual magnetic flux calculation unit to the second excitation-inrush-current suppression apparatus,
a first residual magnetic flux receiving unit configured to receive the residual magnetic fluxes of the three phases of the transformer from the second excitation-inrush-current suppression apparatus,
a first power-supply-voltage measurement unit configured to measure three-phase alternating-current voltages of the first power supply,
a first closing unit configured to close a specific phase of the three phases of the first breaker at a first closing phase for suppressing an excitation inrush current, the specific phase being either a phase having a maximum absolute value or a minimum absolute value among the residual magnetic fluxes of the three phases, based on the three-phase alternating-current voltages of the first power supply measured by the first power-supply-voltage measurement unit and residual magnetic fluxes of the three phases of the transformer calculated by the first residual magnetic flux calculation unit or the residual magnetic fluxes of the three phases of the transformer received by the first residual magnetic flux receiving unit, and
a second closing unit configured to close two phases other than the specific phase of the first breaker, at a second closing phase for suppressing an excitation inrush current, after closing the specific phase of the first breaker by the first closing unit, and
the second excitation-inrush-current suppression apparatus comprises
a second transformer-voltage measurement unit configured to measure three-phase alternating-current voltages of the transformer,
a second transformer power-off detection unit configured to detect that the transformer is disconnected from the power supplies by the second breaker,
a second residual magnetic flux calculation unit configured to calculate residual magnetic fluxes of three phases of the transformer, based on the three-phase alternating-current voltages measured by the second transformer-voltage measurement unit, when the transformer is detected to be disconnected from the power supplies by the second transformer power-off detection unit,
a second residual magnetic flux transmission unit configured to transmit the residual magnetic fluxes of the three phases of the transformer calculated by the second residual magnetic flux calculation unit to the first residual magnetic flux receiving unit of the first excitation-inrush-current suppression apparatus,
a second residual magnetic flux receiving unit configured to receive the residual magnetic fluxes of the three phases of the transformer from the first residual magnetic flux transmission unit of the first excitation-inrush-current suppression apparatus,
a second power-supply-voltage measurement unit configured to measure three-phase alternating-current voltages of the second power supply,
a third closing unit configured to close a specific phase of the three phases of the second breaker at a third closing phase for suppressing an excitation inrush current, the specific phase being either a phase having a maximum absolute value or a minimum absolute value among the residual magnetic fluxes of the three phases, based on the three-phase alternating-current voltages of the second power supply measured by the second power-supply-voltage measurement unit and residual magnetic fluxes of the three phases of the transformer calculated by the second residual magnetic flux calculation unit or the residual magnetic fluxes of the three phases of the transformer received by the second residual magnetic flux receiving unit, and a fourth closing unit configured to close two phases other than the specific phase of the second breaker, at a fourth closing phase for suppressing an excitation inrush current, after closing the specific phase of the second breaker by the third closing unit.

5. The excitation-inrush-current suppression system of claim 4, wherein the first transformer power-off detection unit detects that the transformer is disconnected from the power supplies by the first breaker, based on a signal indicating opening status, which is received from the first breaker, and three-phase alternating-current voltages measured by the first transformer voltage measurement unit, and the second transformer power-off detection unit detects that the transformer is disconnected from the power supplies by the second breaker, based on the signal indicating opening, which is received from the second breaker, and the three-phase alternating-current voltages measured by the second transformer-voltage measurement unit.

6. The excitation-inrush-current suppression system of claim 1, wherein when the specific phase is a phase having a maximum absolute value, the first closing unit takes, as the first closing phase, a phase at a zero point at which the specific phase of the three-phase alternating-current voltages of the first power supply changes from the same polarity as the residual magnetic flux to an opposite polarity, or when the specific phase is a phase having a minimum absolute value, the first closing unit takes, as the first closing phase, a phase at which the specific phase of the three-phase alternating-current voltages of the first power supply has a wave height value, and when the specific phase is a phase having a maximum absolute value, the third closing unit takes, as the third closing phase, a phase at a zero point at which the specific phase of the three-phase alternating-current voltages of the second power supply changes from the same polarity as the residual magnetic flux to an opposite polarity, or when the specific phase is a phase having a minimum absolute value, the third closing unit takes, as the first closing phase, a phase at which the specific phase of the three-phase alternating-current voltages of the first power supply has a wave height value.

7. An excitation-inrush-current suppression method of suppressing an excitation inrush current of a transformer connected through a first breaker to a first power supply and connected through a second breaker to a second power supply, the method comprising:

measuring three phase alternating current voltages;

detecting that the transformer is disconnected from the power supplies;

calculating residual magnetic fluxes of three phases of the transformer, based on the measured three-phase alternating-current voltages of the transformer, when the transformer is detected to be disconnected from the power supplies;

measuring the three-phase alternating-current voltages of the first power supply;

closing a specific phase of the three phases of the first breaker at a first closing phase for suppressing an excitation inrush current, the specific phase being either a phase having a maximum absolute value or a minimum absolute value among the residual magnetic fluxes of the three phases, based on the calculated residual magnetic fluxes of the three phases of the transformer and the measured three-phase alternating-current voltages of the first power supply;

closing two phases other than the specific phase of the first breaker, at a second closing phase for suppressing an excitation inrush current, after closing the specific phase of the first breaker;

measuring the three-phase alternating-current voltages of the second power supply;

closing a specific phase of the three phases of the second breaker at a third closing phase for suppressing an excitation inrush current, the specific phase being either a phase having a maximum absolute value or a minimum absolute value among the residual magnetic fluxes of the three phases, based on the calculated residual magnetic fluxes of the three phases of the transformer and the measured three-phase alternating-current voltages of the second power supply;

closing two phases other than the specific phase of the second breaker, at a fourth closing phase for suppressing an excitation inrush current, after closing the specific phase of the second breaker.

8. An excitation-inrush-current suppression method of suppressing an excitation inrush current of a transformer connected through a first breaker to a first power supply and connected through a second breaker to a second power supply, by a first excitation-inrush-current suppression apparatus and a second excitation-inrush-current suppression apparatus, the method comprising:

measuring three-phase alternating-current voltages of the transformer, by the first excitation-inrush-current suppression apparatus;

detecting that the transformer is disconnected from the power supplies by the first breaker, by the first excitation inrush-current suppression apparatus;

calculating residual magnetic fluxes of three phases of the transformer, based on the measured three-phase alternating-current voltages of the transformer, when the first excitation-inrush-current suppression apparatus detects that the transformer is disconnected from the power supplies by the first breaker;

transmitting the calculated residual magnetic fluxes of the three phases of the transformer to the second excitation-inrush-current suppression apparatus, by the first excitation-inrush-current calculation unit;

receiving the residual magnetic fluxes of the three phases of the transformer from the second residual magnetic flux control apparatus of the first excitation-inrush-current suppression apparatus;

measuring three-phase alternating-current voltages of the first power supply, by the first excitation-inrush-current suppression apparatus;

closing a specific phase of the three phases of the first breaker at a first closing phase for suppressing an excitation inrush current, by the first excitation-inrush-current calculation unit, the specific phase being either a phase having a maximum absolute value or a minimum absolute value among the residual magnetic fluxes of the three phases, based on the measured three-phase alternating-current voltages of the first power supply and the calculated residual magnetic fluxes of the three phases of the transformer or the received residual magnetic fluxes of three phases of the transformer;

closing two phases other than the specific phase of the first breaker, at a second closing phase for suppressing an excitation inrush current, by the first excitation-inrush-current suppression apparatus, after closing the specific phase of the first breaker;

measuring three-phase alternating-current voltages of the transformer, by the second excitation-inrush-current suppression apparatus;

detecting that the transformer is disconnected from the power supplies by the second breaker, by the second excitation-inrush-current suppression apparatus;

calculating residual magnetic fluxes of three phases of the transformer, based on the measured three-phase alternating-current voltages of the transformer, when the second excitation-inrush-current suppression apparatus detects that the transformer is disconnected from the power supplies by the second breaker;

transmitting the calculated residual magnetic fluxes of the three phases of the transformer to the first excitation-inrush-current suppression apparatus, by the second excitation-inrush-current calculation unit;

receiving the residual magnetic fluxes of the three phases of the transformer from the first residual magnetic flux control apparatus of the second excitation-inrush-current suppression apparatus;

measuring three-phase alternating-current voltages of the second power supply, by the second excitation-inrush-current suppression apparatus;

closing a specific phase of the three phases of the second breaker at a third closing phase for suppressing an excitation inrush current, by the second excitation-inrush-current calculation unit, the specific phase being either a phase having a maximum absolute value or a minimum absolute value among the residual magnetic fluxes of the three phases, based on the measured three-phase alternating-current voltages of the second power supply and the calculated residual magnetic fluxes of the three phases of the transformer or the received residual magnetic fluxes of three phases of the transformer; and closing two phases other than the specific phase of the second breaker, at a fourth closing phase for suppressing an excitation inrush current, by the second excitation-inrush-current suppression apparatus, after closing the specific phase of the second breaker.

* * * * *